(12) United States Patent
Vikutan

(10) Patent No.: US 7,913,230 B2
(45) Date of Patent: Mar. 22, 2011

(54) COMPUTER-IMPLEMENTED METHODS AND SYSTEMS FOR GENERATING SOFTWARE TESTING DOCUMENTATION AND TEST RESULTS MANAGEMENT SYSTEM USING SAME

(75) Inventor: Gene Vikutan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1086 days.

(21) Appl. No.: 11/669,913

(22) Filed: Jan. 31, 2007

(65) Prior Publication Data

US 2008/0184206 A1    Jul. 31, 2008

(51) Int. Cl.
*G06F 9/44* (2006.01)
(52) U.S. Cl. ......... 717/124; 717/125; 717/126; 717/135
(58) Field of Classification Search .................. 717/124
See application file for complete search history.

(56) References Cited

U.S. PATENT DOCUMENTS

| | | | | |
|---|---|---|---|---|
| 6,978,218 | B1 * | 12/2005 | Kolb et al. | 702/122 |
| 7,055,137 | B2 * | 5/2006 | Mathews | 717/125 |
| 2005/0204201 | A1 * | 9/2005 | Meenakshisundaram et al. | 714/38 |
| 2005/0256665 | A1 * | 11/2005 | Hartmann et al. | 702/121 |
| 2006/0101404 | A1 * | 5/2006 | Popp et al. | 717/124 |

OTHER PUBLICATIONS

Kent Beck, Erich Gamma, "JUnit Cookbook" http://junit.sourceforge.net/doc/cookbook/cookbook.htm, printed Nov. 2, 2006 (3pgs).

Mike Clark, "JUnit FAQ" http://junit.sourceforge.net/doc/faq/faq.htm, printed Nov. 2, 2006 (26pgs).
David Morris, "JUnit Automates Java Testing" http://www.itjungle.com/mpo/mpo110603-story01.html, printed Nov. 2, 2006 (8pgs).
Leesa Murray et al., "Extending Test Templates with Inheritance" 0-8186-8081-4/97, 1997 IEEE, pp. 80-87.
P.A. Stocks, D.A. Carrington, "Test Templates: A Specification-based Testing Framework" 0270-5257/93, 1993 IEEE, pp. 405-414.
Mercury, "Software Testing Tools—Mercury TestDirector Test Management Software", http://www.mercury.com/us/products/quality-center/testdirector/, printed Jun. 23, 2006, 1pg.
Mercury, "Products—Mercury TestDirectorTM: How it Works", http://www.mercury.com/us/products/quality-center/testdirector/works.html, printed Jun. 23, 2006, 1pg.
Mercury, "Products—Mercury TestDirector Features", http://www.mercury.com/us/products/quality-center/testdirector/features.html, printed Jun. 23, 2006, 1pg.

* cited by examiner

*Primary Examiner* — Thomas K Pham
(74) *Attorney, Agent, or Firm* — Kilpatrick Townsend & Stockton LLP

(57) ABSTRACT

A computer-implemented method for generating and managing test documentation for a software product may include steps of generating a test template; generating at least one test scenario for each of a plurality of functional areas, each test scenario being configured to test a business flow that mimics how an end user would use the software product; associating the generated test scenario(s) with the generated test template; generating at least one test case that includes a plurality of test steps; associating the generated test case(s) with the generated test template; copying the test template to generate test results, the generated test results being independent of the generated test template, and carrying out a test cycle by executing the test scenario(s) and the test case(s) associated with the generated test results of the generated test template and storing the results of the executed test scenario(s) and the executed test case(s) in a database.

20 Claims, 10 Drawing Sheets

File  Edit  View  Go  Help

Quality Assurance — 601

Test Template | Test Results — 602

TEST RESULT CREATION

General info

| | | | |
|---|---|---|---|
| Product: | XYZ CO SALES ▶ — 604 | Template: | XYZ Sales 11.5.10 ▶ — 606 |
| Patch Type: | General ▶ | Environment: | HCX |
| ARU: | | Baseline: | 12 |
| Patch Category: | Backport ▶ | Patch Version: | |
| Man/hours Req'd: | 780 | Recut #: | 1 |
| Priority: | Medium ▶ — 608 | Customer Name: | 1234567 |
| Phase: | QA ▶ | Status: | XYZ Sales 11.5.10 |
| Task Number: | 1234567 | Related Tasks | |

Additional info

Summary  [ ◀ ▶ ]

Related Bugs  [ ◀ ▶ ]

Comments  [ ◀ ▶ ]

Create — 610

Quality Assurance — File, Edit, View, Go, Help

Test Template | Test Results

STATISTICS

Coverage Information (802)

| Information | Number | % |
|---|---|---|
| Total Manual Cases: | 1587 | 100% |
| Manual Covered: | 1573 | 99.12% |
| Manual Not Covered: | 14 | 0.88% |
| Passed (Out of Total): | 1509 | 95.09% |
| Time Tested (Days): | 58 | N/A |

Test Cases By Status (804)

| Status | Tests | %from Total | % from Covered |
|---|---|---|---|
| PASS | 1509 | 95.09% | 95.93% |
| FAIL | 64 | 4.03% | 4.07% |
| BLOCKED | 14 | 0.88% | 0.89% |

Coverage by Priority (806)

| Priority | Total | Covered | Pass | Fail | Blocked |
|---|---|---|---|---|---|
| HIGH | 367 | 99.73% | 97% | 2.72% | 0.27% |
| MEDIUM | 1102 | 98.82% | 94% | 3.99% | 1.18% |
| LOW | 118 | 100% | 91% | 8.47% | 0.00% |

Coverage by Type (808)

| Type | Total | Covered | Pass | Fail | Blocked |
|---|---|---|---|---|---|
| Existing Feature | 524 | 97.90% | 96.76% | 1.15% | 2.10% |
| New Feat | 1063 | 99.72% | 94.26% | 5.46% | 0.28% |

SHOW STOPPERS (810)

| Bug | Owner | Subject | Updated | Fix By | Fixed In |
|---|---|---|---|---|---|
| 34582 | gbatra | MASS1R10:11510: FUNC: UNABLE TO CREATE/ VIEW DATA GRANTS AS FUNCTIONAL ADMIN OBJECTS IN V/B VIEW MODE | 03/01/06 | | |

COMPUTER-IMPLEMENTED METHODS AND SYSTEMS FOR GENERATING SOFTWARE TESTING DOCUMENTATION AND TEST RESULTS MANAGEMENT SYSTEM USING SAME

BACKGROUND OF THE INVENTION

1. Field of the Invention

Embodiments of the present invention relate to computer-implemented methods and systems for generating, maintaining and managing software testing documentation and the results generated by such testing.

2. Description of the Prior Art and Related Information

As software becomes increasingly complex, the tools and framework for testing the software must keep pace. The functionality of the software must be thoroughly tested to ensure that it performs as designed, to ensure that it is stable and that it smoothly interoperates with other software applications and modules in its intended working environment. This testing is the job of Quality Assurance.

As Product Marketing defines release features and Engineering implements them, Quality Assurance (QA) writes test cases to validate these features. Conventionally, QA engineers develop test plans that test predetermined portions of the functionality of a piece of software. Conventionally, such test plans are static files such as, for example, Microsoft Excel® or Microsoft Word®. As the QA engineer tests the software according to the developed test plans, he or she may manually enter the test results of such testing into these static files. For example, the QA engineer may enter whether the particular radio buttons behaved as expected, whether expected values were indeed obtained, or whether each step passes or fails a predetermined test. As the testing process continues and several iterations of the testing process are carried out, a great many such static files may be generated. Such static files containing the test results can be difficult to manage, especially as the number of such files grows large. It is also difficult to track changes over time using such static files, as the number of tests changes with each release of the software under test. Moreover, when these static files are generated, it is difficult to precisely identify the scope of each test cycle, as each test cycle requires test cases to be updated with the appropriate information such as, for example, the status of test runs, bug numbers and blocking issues. Lastly, such conventional individual static files make it increasingly difficult to collect statistics and to monitor the progress of the most basic QA activities such as, for example, QA test planning and QA testing.

There have been some efforts by software companies to solve the aforementioned test documentation management and test cycle scope management. Such efforts have included managing all documentation in such static or flat files, and using test management systems, such as the package "TestDirector" by Mercury Interactive of Mountain View, Calif. However, this approach (and others like it) is not believed to enable to define and freeze the test scope for every test cycle—which is paramount if meaningful comparisons are to be made across testing cycles. None of these solutions are believed to enable the collection of statistics and the generation of statistics for an isolated test cycle.

SUMMARY OF THE INVENTION

According to an embodiment thereof, the present invention is a computer-implemented method for generating and managing test documentation for a software product that includes a plurality of functional areas. Such a method may include steps of generating a test template; generating at least one test scenario for each of the plurality of functional areas, each of the at least one generated test scenarios being configured to test a business flow that mimics how an end user would use the software product; associating the generated at least one test scenario with the generated test template; generating at least one test case, the at least one generated test case including a plurality of test steps; associating the generated at least one test case with the generated test template; copying the test template to generate test results, the generated test results being independent of the generated test template, and carrying out a test cycle by executing the at least one test scenario and the at least one test case associated with the generated test results of the generated test template and storing the results of the executed at least one test scenario and the executed at least one test case in a database.

According to further embodiments, the generating, associating, copying and executing steps may be carried out from a browser. Each of the at least one generated test scenarios may be associated with one of the plurality of functional areas. The method may also include a step of generating statistics on the stored results of the executed at least one test scenario and the executed at least one test case. The computer-implemented may also include a step of setting a filter to restrict execution of the at least one test scenario and of the at least one test case in a database to selected scenarios and test cases. The computer-implemented method may also include a step of associating one of a plurality of priority levels to each test scenario and to each test case, and wherein the filter is configured to restrict execution of the at least one test scenario and of the at least one test case to those test scenarios and to those test cases associated with a selected priority level and to those test scenarios and to those test cases associated with a priority level that is lower that the selected priority level. The copying step may be carried out with the generated test results being unaffected by subsequent changes to the generated test template. The copying step may be carried out with the generated test template being unaffected by subsequent changes to the generated test results. The method may also include a step of creating a new test template by copying the generated test template and modifying a test scenario and/or test case associated with the generated test template. The generated test results may include expected values for at least some of the plurality of test steps. The computer-implemented method may also include a step of populating the generated test results with actual values obtained as a result of carrying out the executing step. A step of assigning a unique automation identifier to each generated at least one test scenario and to each generated at least one test case may also be carried out. The computer-implemented method may further include a step of providing an Application Program Interface (API), the provided API being configured to interface between the generated test results and commercially available automated testing software. A step of providing the commercially available automated testing software with the generated unique automation identifier of each generated at least one test scenario and to each generated at least one test case may also be carried out.

According to another embodiment thereof, the present invention is a machine-readable medium having data stored thereon representing sequences of instructions which, when executed by a computing device, causes the computing device to generate and manage test documentation for a software product that includes a plurality of functional areas, by performing the steps of generating a test template; generating at least one test scenario for each of the plurality of functional areas, each of the at least one generated test scenarios being configured to test a business flow that mimics how an end user would use the software product; associating the generated at least one test scenario with the generated test template; generating at least one test case, the at least one generated test case including a plurality of test steps; associating the generated at least one test case with the generated test template; copying the test template to generate test results, the generated test results being independent of the generated test template, and carrying out a test cycle by executing the at least one test scenario and the at least one test case associated with the generated test results of the generated test template and storing the results of the executed at least one test scenario and the executed at least one test case in a database.

Still another embodiment of the present invention is a computer system for generating and managing test documentation for a software product that includes a plurality of functional areas. The computer system may include at least one processor; at least one data storage device coupled to the at least one processor, and a plurality of processes spawned by said at least one processor. The processes may include processing logic for generating a test template; generating at least one test scenario for each of the plurality of functional areas, each of the at least one generated test scenarios being configured to test a business flow that mimics how an end user would use the software product; associating the generated at least one test scenario with the generated test template; generating at least one test case, the at least one generated test case including a plurality of test steps; associating the generated at least one test case with the generated test template; copying the test template to generate test results, the generated test results being independent of the generated test template, and carrying out a test cycle by executing the at least one test scenario and the at least one test case associated with the generated test results of the generated test template and storing the results of the executed at least one test scenario and the executed at least one test case in a database.

BRIEF DESCRIPTION OF THE DRAWINGS

FIG. 6 shows an exemplary test result creation screen, according to an embodiment of the present invention.

FIG. 8 shows a statistics screen for test results statistics, according to an embodiment of the present invention.

DETAILED DESCRIPTION

A test case may be defined as the smallest testable entity that a QA engineer can validate. Each test case may be linked to the features it is designed to validate. Each test case may include one or more test steps, which are individual steps for testing a particular functionality of the software product under test. Test steps may return, for example, a True or a False or a predetermined value as an expected result when the test steps are executed against the software product under test. In turn, one or more test cases may be grouped in Test Scenarios. Test Scenarios may be designed to test a business flow that mimics how the end user would use the software product.

Figure 1:
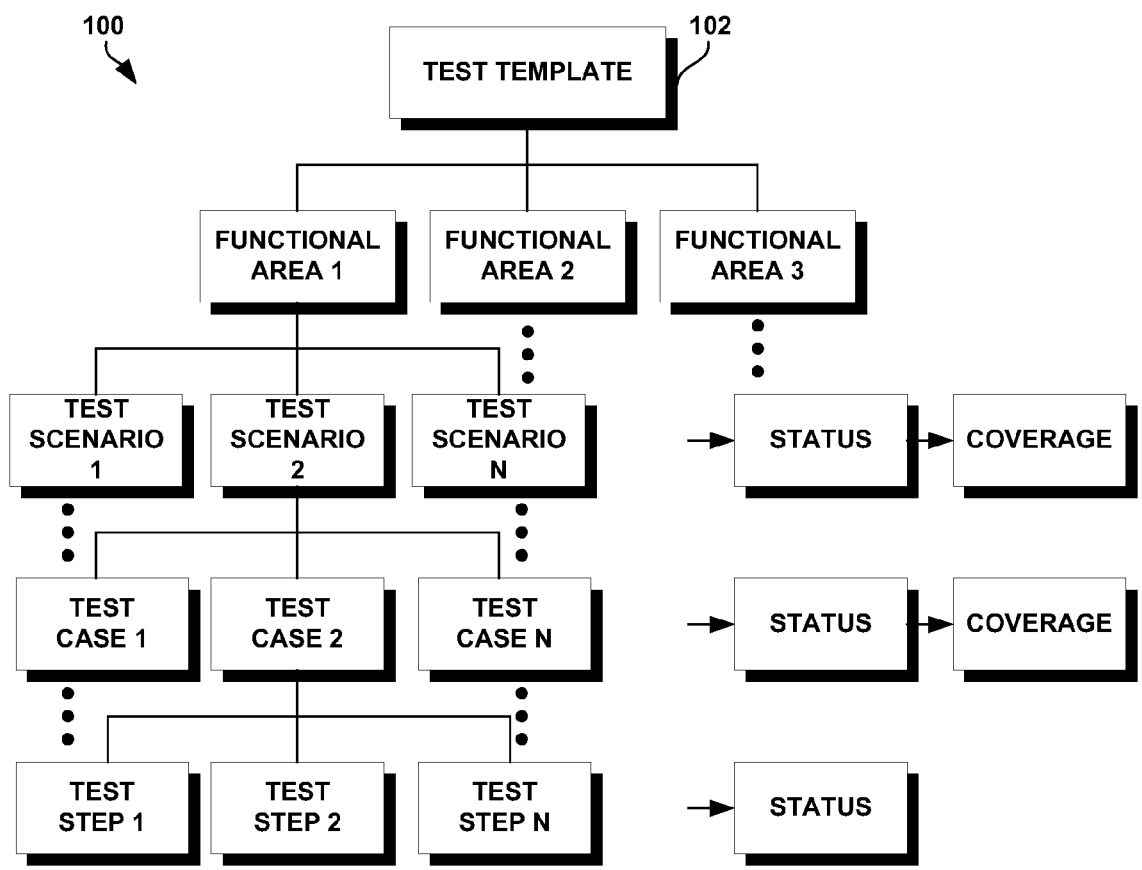
FIG. 1 shows a data model for a test template according to an embodiment of the present invention.

FIG. 1 shows a data model for a test template according to an embodiment of the present invention. As shown therein, the data model 100 for the test template 102 shows that a test template may include within its scope one or more functional areas, each of which defining testing procedures for a predefined functional area of the software product under test. For example and as shown in the exemplary case of FIG. 1, a test template 102 may include three functional areas. One or more test scenarios may be associated with each of these functional areas. In FIG. 1, only the test scenarios associated with functional area 1 are shown. In turn, each of the test scenarios may include one or more test cases (such as shown for test scenario 2 in FIG. 1), and each test case may include one or more test steps (as is shown for test case 2 in FIG. 2). According to embodiments of the present invention, statistics may be gathered and stored for each scenario, test case or test step, individually or across multiple test cycles in which execution of such test scenarios, test cases and test steps are repeated. According to an embodiment of the present invention, a test cycle may be defined as executing the tests scenarios/cases/steps associated with a test template. However, according to further embodiments of the present invention, not all test scenarios, test cases and test steps of a test template need be executed in each test cycle, as filters may be applied to cause the execution of only selected ones of the test scenarios/cases/steps associated with any given test template.

Embodiments of the present invention may also be configured to provide and maintain status and coverage statistics, to provide the QA engineer with a snapshot as to how many such test scenarios, cases and steps have been run and/or have been successfully run (such as is the case when the actual results of running the test scenarios, test cases and test steps matches the expected results entered in the test template).

Figure 2:
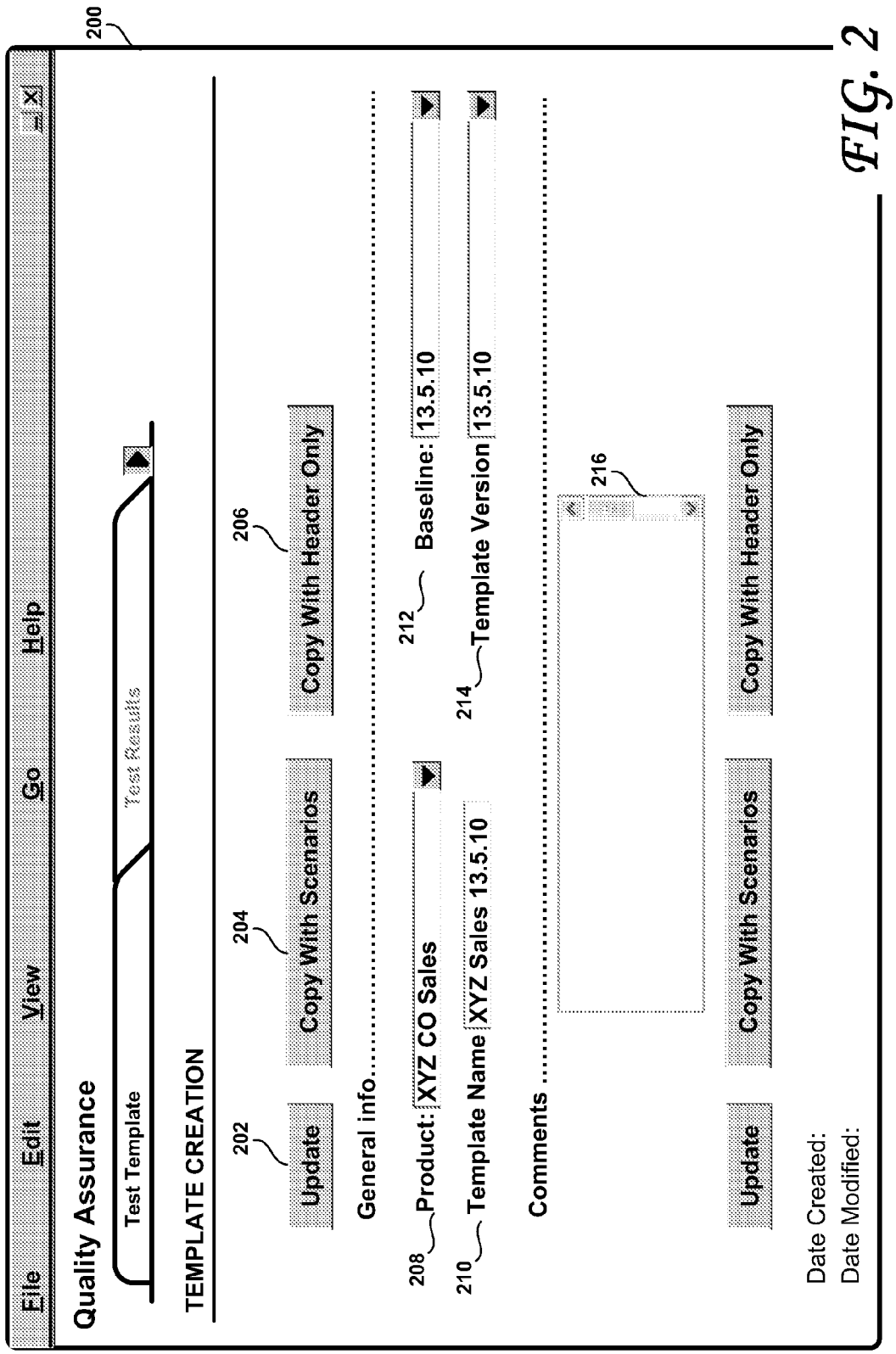
FIG. 2 shows an exemplary screen for the creation of a test template, according to an embodiment of the present invention.

FIG. 2 shows a page configured to create a test template, according to an embodiment of the present invention. As shown therein, the (e.g., HTML-based) page 200 (rendered by a browser, for example) may include a field 208 for the user to specify the product tested by the test scenarios, test cases and test steps of the test template being created. In the example developed in FIG. 2, the product is a fictional "XYZ Co. Sales", a software product to assist enterprise sales teams. The template being created may be given a name in field 210. Various identifying information may also be provided, such as, for example, release, build, or baseline, as shown at 212. Each template may be given or assigned a template version number, as shown at 214. Templates may be created from scratch, or may be copied from an existing test template, either with all of its constituent test scenarios using button 204 or with its headers only, using button 206. This enables the QA engineer to design a new test template without starting over each time. Also, a previously created test template may be updated with new or changed information, using button 202. A free form comment field 216 may also be provided, enabling the QA engineer to enter his or her comments on this test template.

According to an embodiment, completing a new test template may include steps of creating a new test template as shown in FIG. 2, adding test scenarios and test cases to the created test template, creating presentation templates and, after proper review of the newly created test template, creating test results from the test template for each test cycle. According to embodiments of the present invention, all or selected ones of the test scenarios and test cases (and associated test steps) of a test template may be run in each test cycle. That is, according to an embodiment of the present invention, test results may be created for every new test cycle. This ensures that meaningful statistics may be generated and stored from the test results of all or the same selected test scenarios and test cases of a test template for each test cycle.

Figure 3:
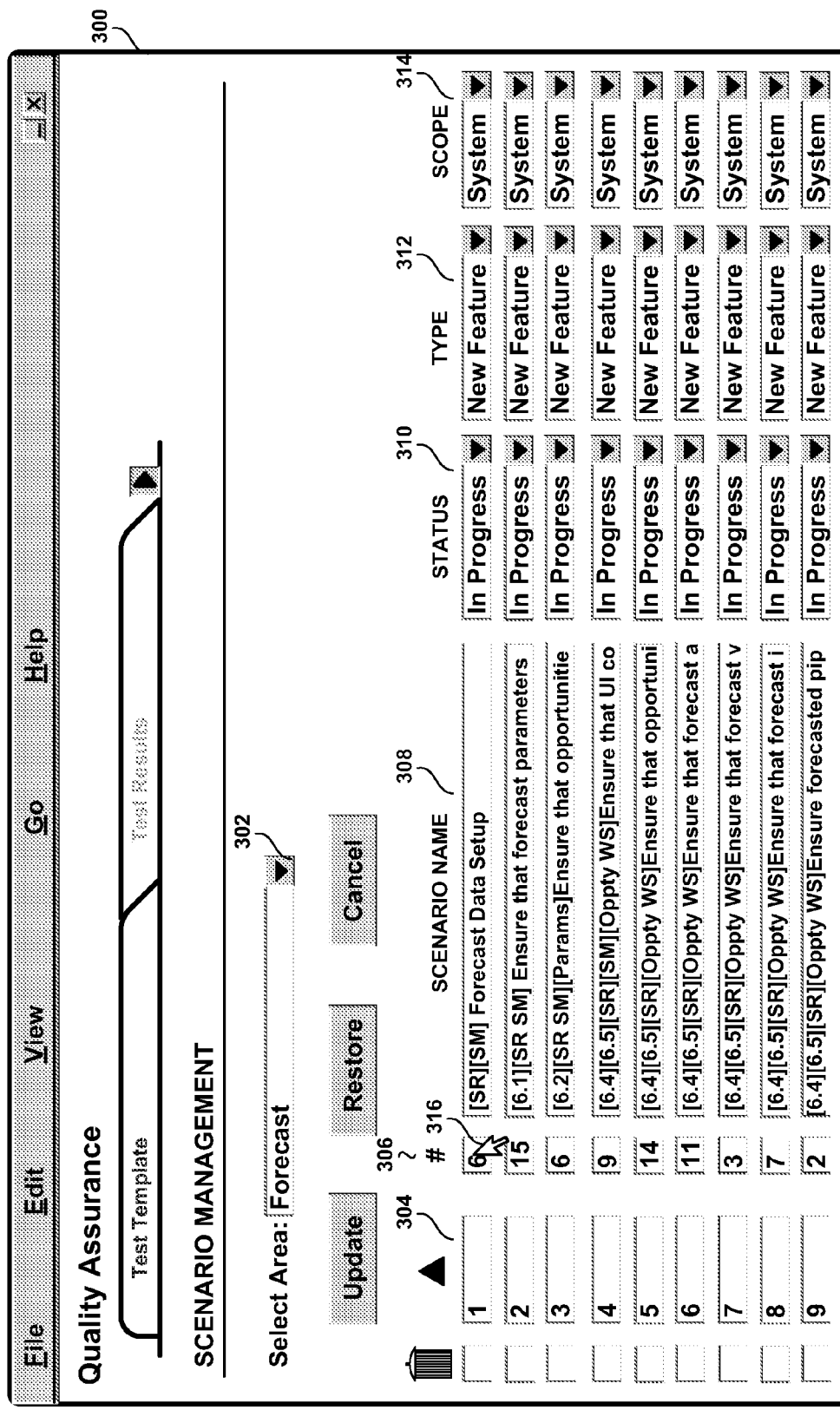
FIG. 3 shows an exemplary screen for the management of test scenarios and test cases of a selected test template, according to an embodiment of the present invention.

FIG. 3 shows an exemplary screen for the management of test scenarios and test cases of a test template, according to an embodiment of the present invention. As shown therein, the user may select a functional area (see FIG. 1) at 302. When a functional area is selected (in this case, Sales Forecast), any test scenarios that are associated with that functional area may be displayed. New scenarios may be added and existing scenarios may be updated. As shown at 304, the list of test scenarios that are associated with the selected functional area may be ordered by the user, or a test scenario order may be assigned automatically. The order in which the test scenarios are displayed may be varied at will. Each test scenario may be given a test scenario name as shown at 308. The status of each test scenario name may be provided at 310, followed by the type of test scenario at 312 and the scope thereof at reference numeral 314. Many other attributes of test scenarios may be provided such as, for example, priority, owner, weight, effort needed to write, execute and/or automate the test scenario, an identification of any associated automated test cases and other attributes, as needed. The number of test cases encompassed by each identified test scenario 308 may be given at 306. Reference numeral 306 may denote a hyperlink, by which the user may be brought to a test case management screen for the test cases of the associated test scenario. For example, the user may select the related test case hyperlink for the Forecast Data Setup test scenario, as indicated at 316.

Figure 4:
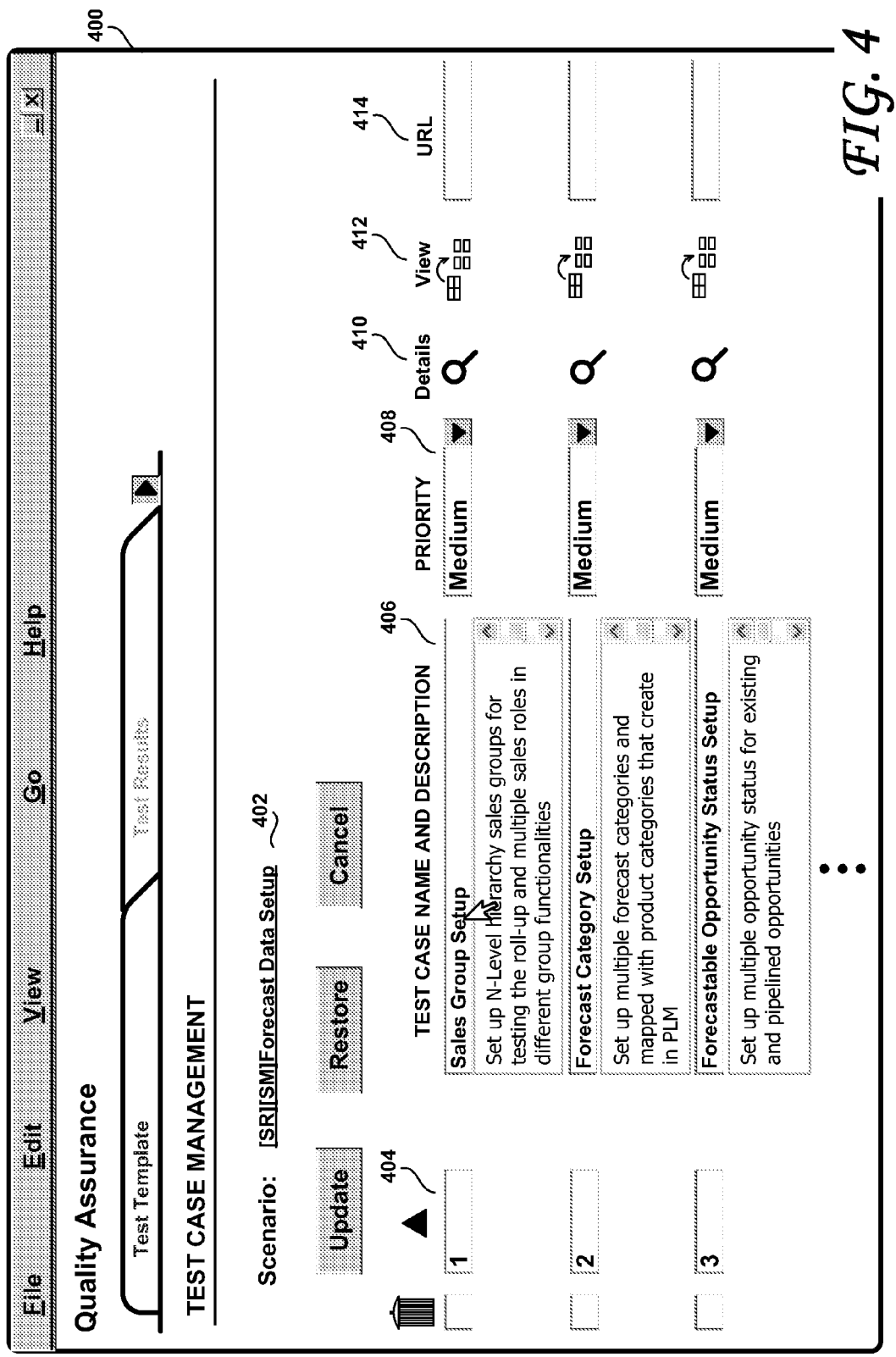
FIG. 4 shows an exemplary test case management screen, according to an embodiment of the present invention.

FIG. 4 shows an exemplary test case management screen, according to an embodiment of the present invention. As shown in the test case management screen 400, the selected scenario is shown at 402. The selected test scenario 402 may be hyperlinked, to enable the user to return to the scenario test screen of FIG. 3. As shown, the test case management screen 400 may be configured to show the test cases associated with the selected test scenario. In the example of FIG. 4, the constituent test cases of the "Forecast Data Setup" test scenario selected at 316 in FIG. 3 are shown. The test cases may be numbered as shown at 404 and may be shown either in ascending or descending order, for example. The name of each test case may be shown at 406, followed by a free form description of the functionality of the test case. Selected attributes of each test case may be shown such as, for example, priority 408 and a Universal Resource Locator (URL) for the test case, as shown at 414. Details of each test case may be displayed at 410 and the test case may be viewed by selecting 412. Other attributes may also be shown within screen 400 such as, for example, efforts to write, execute and/or automate, the automated test cases, the update date, to name a few of the possibilities.

From a managerial point of view, QA management may assign testing responsibility by functional areas. That is, responsibility for the testing of one or more functional areas of the software under test may be delegated to one or more QA teams or engineers. For example, each QA engineer may have particular responsibility for one or more testing scenarios to test a predetermined functionality of the software being tested. Such a QA engineer (or team thereof) would then be responsible for writing the test scenarios, the test cases and all of the constituent test steps thereof and integrating them into a new or existing test template from which test results are generated for each test cycle.

Figure 5:
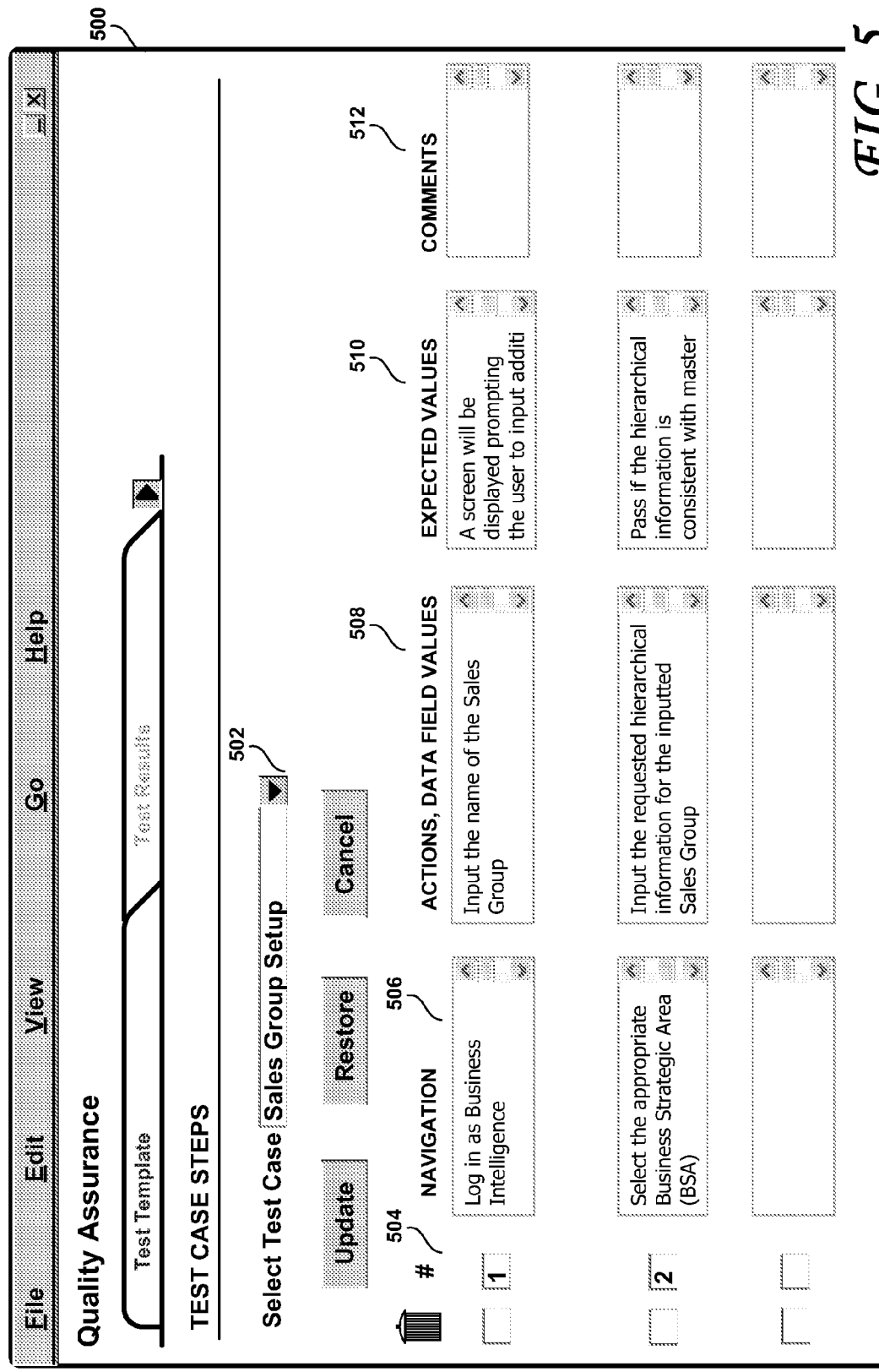
FIG. 5 shows an exemplary test step management screen, according to an embodiment of the present invention.

FIG. 5 shows an exemplary test step management screen, according to an embodiment of the present invention. As shown, this test step management screen 500 enables the user to create and/or edit or update the test steps associated with the test case indicated at 502. In this exemplary case, the test step management screen 500 shows constituent steps of the Sales Group Setup test case. The test steps of the selected test case may be numbered, either by the user or by automatically. A navigation text box 506 may provided for each step, detailing where in the application under test the test steps are to be applied. A text box 508 may detail the actions the QA engineer or the automatic test system is to take, and the data field or fields that are to be populated with test values, etc. The expected values or expected response from the system and/or a description thereof may be entered at 510. Successful execution of the test step may be said to occur when the expected response, or expected value returned by the application under test when the test scenarios, test cases and test steps are executed matches the expected response or value entered at 510. A free-form content text box 512 may be provided for the QA engineer to enter any comment deemed necessary or useful for any test step. Once the test steps for each test case are defined, and once the test cases for each test scenario of the template are defined, the test template may be considered to be fully defined. This freezes the scope of testing. Test results may then be generated for the defined test template, as described below and as shown relative to FIG. 6. In fact, multiple test results may be derived from a single test template. For example, after each build, new test results may be created from a single and same test template. Alternatively, the test template itself may be suitably modified (using the copy with scenarios feature, for example), thereby creating a new test template (now independent of the first test template) from which multiple test results (e.g., one for each new testing cycle) may be generated. Note that the created test template may be reviewed and validated by QA management prior to any test results being generated therefrom.

According to embodiments of the present invention, a test result may be understood as being a snapshot (e.g., a copy) of a test template. Indeed, a test result may be an exact replica or a substantially identical copy of the test template from which it was created, preserving all of its constituent test scenarios, test cases, their respective formats, hierarchical structure and data organization. According to embodiments of the present inventions, once created from a test template, a test result is a completely independent entity from the test template from which it was created. That is, according to embodiments of the present invention, subsequent changes to a test template will not be propagated to any test result derived from that test template. That is, historical test results, according to embodiments of the present invention, are not changed because the test template from which they were generated has itself been changed. The independence of the test result from the test template also works in the other direction, as changes to the test result will not be automatically propagated back to the test template from which the test result was created. The independence of the test results from the test template from which they were created is believed to be significant in generating meaningful status and coverage statistics based upon historical test results that are based upon a common test template.

As stated above, new test results are created for every new test cycle. This type of test document management allows concurrent and independent tracking of test results and of any modification of test templates. Because all of the test results of each test cycle are now stored in a database and managed separated from the test templates, meaningful comparisons may be made between the test results generated in different test cycles.

FIG. 6 shows an exemplary test result creation screen, according to an embodiment of the present invention. To create test results, a user of an application embodying aspects of the present inventions would navigate to the "Test Results" tab 602 (whereupon the "Test Template" tab 601 would then become grayed out or otherwise de-emphasized) and would select the product under test, as shown at 604. Selecting the product under test populates the Templates list box 606 with all of the templates that have been created for that product and that have been associated with the selected product. Additional information (for example, environment, baseline, patch version, recut number, customer name, status and related tasks) may be entered as desired or required, as shown. According to embodiments of the present invention, filters may be set up to cause the testing of only selected test cases and test scenarios, so that only a selectable subset of all test scenarios and test cases are run during any given test cycle. For example, the priority select box 608 may be used to cause the execution of test cases and test scenarios having a predetermined priority level (e.g., High, Medium, Low). In this regard, the priority of test scenarios takes precedence over the priority of test cases, as test scenarios are hierarchically higher than test cases, as shown in the data model of FIG. 1. For instance, if the user sets this filter to "High", only high priority test scenarios and high priority test cases associated with these high priority test scenarios will be selected for execution. High priority test cases associated with test scenarios having only a "Medium" priority level will be ignored and will not be represented in the test results. When all desired fields have been entered, the "Create" button 610 may be pressed as shown, thereby creating new test results, the newly created test results being associated with a test result identifier (ID), according to the data entered and selected by the user.

Figure 7:
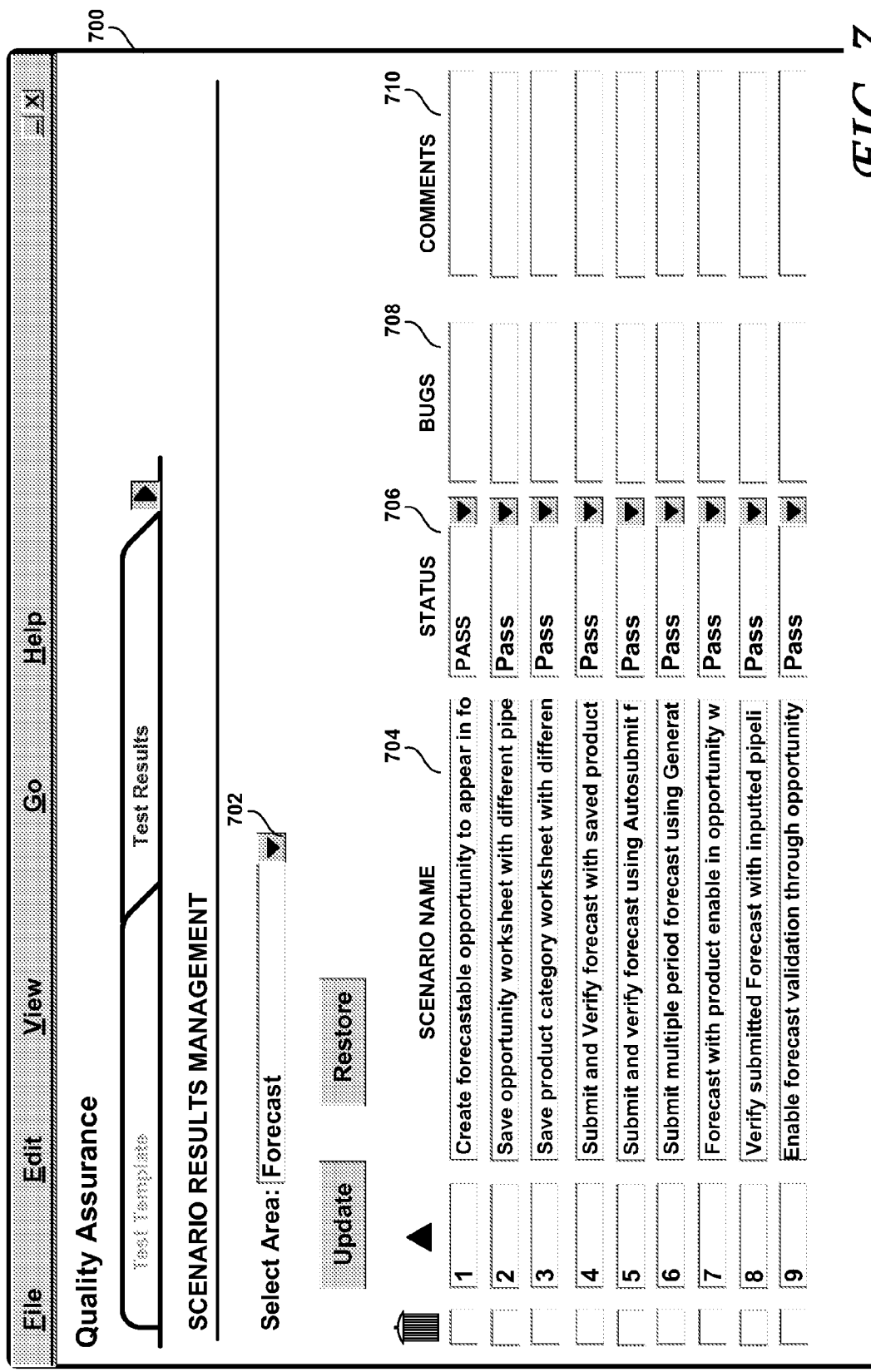
FIG. 7 shows an exemplary scenario results management screen, according to an embodiment of the present invention.

FIG. 7 shows an exemplary scenario results management screen, according to an embodiment of the present invention. The scenario results management screen 700 may provide for the user to select from among a plurality of functional areas, such as shown at 702. Thereafter, the test scenarios associated with the selected functional area may be shown in numbered form, for example, as shown at 1-9 in FIG. 7. The test scenario name at 704 and whether the test scenario successfully passed or failed may also be shown at 706. Bug numbers may be entered at 708 (in comma-delimited format, for example) and comments may be entered by the QA engineer at 710. A bug report screen may be generated, to show the user the list of bugs by bug number, along with full descriptions thereof and other bug-related attributes.

When all test scenarios and test cases of the selected test template(s) have been run, embodiments of the present invention may be configured to enable statistics to be gathered from the obtained test results. According to embodiments of the present invention, the test results may be selectively configured in whatever format is desired. For example, the test results (now stored in a database) may be formatted in HTML for rendering on a browser screen, may be formatted in Rich Text Format (RTF) or in any commonly available word processing or spreadsheet application (such as Microsoft Word® or Microsoft Excel® format, for example) or in another portable format such as Adobe Acrobat® PDF format, for example. The obtained test results enable QA engineers to accurately gauge their progress in completing the testing of the selected product. FIG. 8 shows a statistics screen for such test results statistics, according to an embodiment of the present invention. As shown therein, after at least one test cycle, a variety of statistics may be generated including, for example, coverage (the number of test scenarios and cases run out of the total number of such scenarios and test cases for this template) as shown at 802, test cases by status (e.g., pass/fail) as shown at 804, coverage by priority (e.g., High, Medium, Low) as shown at 806 and coverage by type (e.g., existing or new feature), as shown at 808. So called "show stopping" bugs (i.e., the highest-priority bugs that must be fixed) may also be listed in this screen, as shown at 810. It is to be noted that any of the screens described herein may be rendered on a Web browser (as shown), as a PDF file or as a Microsoft Word® file, for example. Historical data and statistics may be maintained on test scenarios results and test case results.

Separating the test template creation process (FIGS. 1-5) from the test execution process (FIGS. 6-9) according to embodiments of the present invention is beneficial, as it allows the QA engineers to freeze the testing parameters before test results are created, and enable QA engineers to store meaningful historical data on past test cycles and to derive useful statistical information therefrom. Indeed, by creating new test results that are independent from the test template from which they are created allows the QA engineers to meaningfully compare test results over multiple test cycles, as the underlying test template from which the test results are created preferably does not change from one testing cycle to the next. For example QA engineers can plot regressions and are able to track the history of bug fixes for a predetermined set of test scenarios and test cases defined within a test template.

Figure 9:
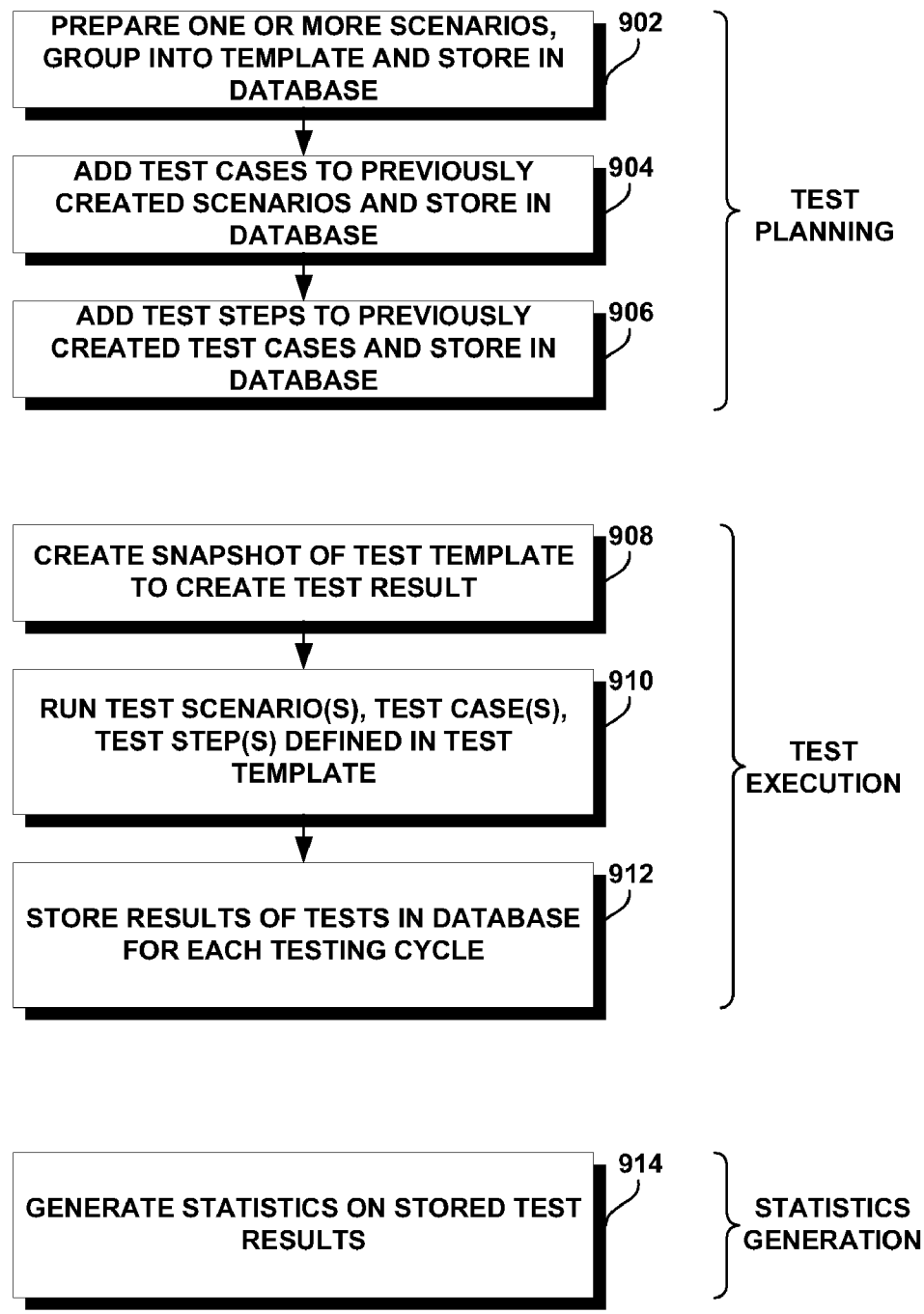
FIG. 9 is a flowchart of a method for authoring test templates and for executing test scenarios and test steps, according to an embodiment of the present invention.

FIG. 9 is a flowchart of a method for authoring test templates and for executing test scenarios and test steps, according to an embodiment of the present invention. As shown therein, step 902 calls for preparing one or more scenarios and optionally grouping the prepared scenarios into a template, and storing the scenario(s) and/or templates in a database. Thereafter, step 904 calls for adding test cases to the previously created test scenarios, and also storing the test cases in the database. Finally, test steps, as shown at 906, may be added to the previously created test cases and these test steps may be stored in the database. From a functional point of view, this is a top-down approach, in which testing goals for predetermined functional areas of the product under test may be first outlined, followed by a broad functional specification of the testing requirements of the various different operative aspects of that functional area. Thereafter, test scenarios may be assigned to different operative areas of the product, followed by test cases that contain the actual test steps needed to validate the proper functioning of the operation of the product under test.

Thereafter, test results may be derived from the stored template, by copying the test template (creating a snapshot thereof) as shown at 908, thereby disassociating the test results from the template used to generate the test results. The scenarios, test cases and test steps defined within the created test result (as specified by the test template) may then be executed, as shown at 910. The results of running these scenarios, test cases and test steps may then be stored as records in a database, as shown at 912. All such stored results will be associated with, but independent of, the test template used to create the test results. The test template may be changed, and new test results generated therefrom as needed. Finally, as shown in step 914, statistics (status, coverage, usage, historical, for example) may be generated from the stored results of running the test scenarios, test cases and test steps as described above.

It is also worthy of note that embodiments of the present invention may be readily adapted to activities other than Quality Assurance. For example, validation checklists may also be created for Release and Operations related tasks. The same approach can be used for Development Unit Testing tasks as well as QA system testing tasks. Embodiments of the present invention are completely platform and browser independent. For example, embodiments of the present invention operate on IE5+, NS4, NS7, Firefox 1, 1.5 browsers and do not require any additional plug-ins. The middle-tier doesn't depend on MS IIS and can be run on any web server capable of running, for example, Java Server Pages (JSPs).

Streamlining QA processes according to embodiments of the present invention and as described herein saves a great deal of QA and management time. Indeed, the methods and testing infrastructure described and shown herein significantly simplifies the job of QA managers, as it provides means of tracking QA (and UT) progress during all phases of a software development lifecycle. For example, the ability to manage test cycle scopes and to preserve historical metrics of every single test run ensures that, at any given moment, upper management is aware of the exact current up-to-date functional test coverage. Embodiments of the present invention allow to quickly identify and to close potential gaps in QA testing for any QA related activity (such as System Testing, Certification testing, Unit Testing, etc). Unlike existing testing management solutions, embodiments of the present invention offer the ability to define and freeze the test scope for every test cycle, to collect statistics and to generate progress reports for isolated test cycles.

According to another embodiment, each testable entity (e.g., test cases and test scenarios) may be assigned a unique automation identifier (ID) upon its creation. A public Application Program Interface (API) may then be provided to enable commonly available automated software testing software such as, for example, Junit (see, for example, www.junit.org) and TestDirector and WinRunner (see www.mercury-.com) to access the test cases and test results stored in a database over a network connection. Such public API allows the automated software testing software to access (over a network connection, for example) and automatically populate the actual results in the created test results including, for example, automatically populating Pass/Fail fields, error codes, values returned and exceptions, for example. Providing a public API, in effect, provides a bridge to allow users to automatically update test cases and test scenarios with status information and actual values. In practice, each time that a user creates a new test case or test scenario, the system may assign a unique automation ID thereto. Then, when users call up their automation scripts, this unique automation ID may be specified in the automation call and the API will update the status of the test results, including the statuses of the test cases, test scenarios and test steps. Preferably, such a public API should integrate with not only Junit (Java-based) and WinRunner (Microsoft Windows-based) test cases and scenarios, but PL/SQL test cases and test scenarios as well.

As noted above, each created test case and test scenario may be assigned a unique automation ID. For integration with Mercury WinRunner, this unique automation ID may be used in the WinRunner Master Driver File in a one-to-one mapping in which a single test case/scenario corresponds to a single WinRunner script, or a one-to-many mapping, in which a single test case/scenario corresponds to multiple WinRunner scripts. WinRunner's Test Driver will then prompt the user for the automation ID for each test suite that is to be run. For integration in Junit, the mapping may be carried out as follows: the functional areas described herein may be mapped to a Junit suite, test scenarios may be mapped to Junit test classes, test cases may be mapped to Junit test methods and test steps may be mapped to a single API call/Junit assert call.

The public API, according to embodiments of the present invention, allows updating test case status, details, and exceptions/error information at run-time. Such an API may be configured to accept the unique test case/scenario IDs and corresponding Test Result ID as their incoming parameters. This approach allows tracking test results for API tests written in any programming language that supports database connectivity (Java, PL/SQL, Perl, TSL, etc.). Such embodiments provide the ability to automatically update test status at run-time, which means that test cases/scenarios can be reviewed by QA, Dev, Product Management and Support teams and appropriate functional coverage estimates can be made before running the tests. Issues identified by API tests can also be evaluated in terms of their functional impact and criticality to customer business flows. Accordingly, this solution may be used for any kind of API testing and automated testing in general, and provides mechanisms of integrating API tests written in virtually any programming language into a single test scripts repository. It also allows tracking and managing various statistics of API tests (new tests vs. regressions, test results by functional priority, ability to differentiate between internal and customer business flows tested, etc). This mechanism also provides the means of assessing functional coverage of API testing and thus can be used for development platform testing, applications API testing, and for evaluating coverage and results of Unit Testing conducted by development teams. It can also be used for collecting results and evaluating functional coverage of automated UI tests for any UI driven product.

Figure 10:
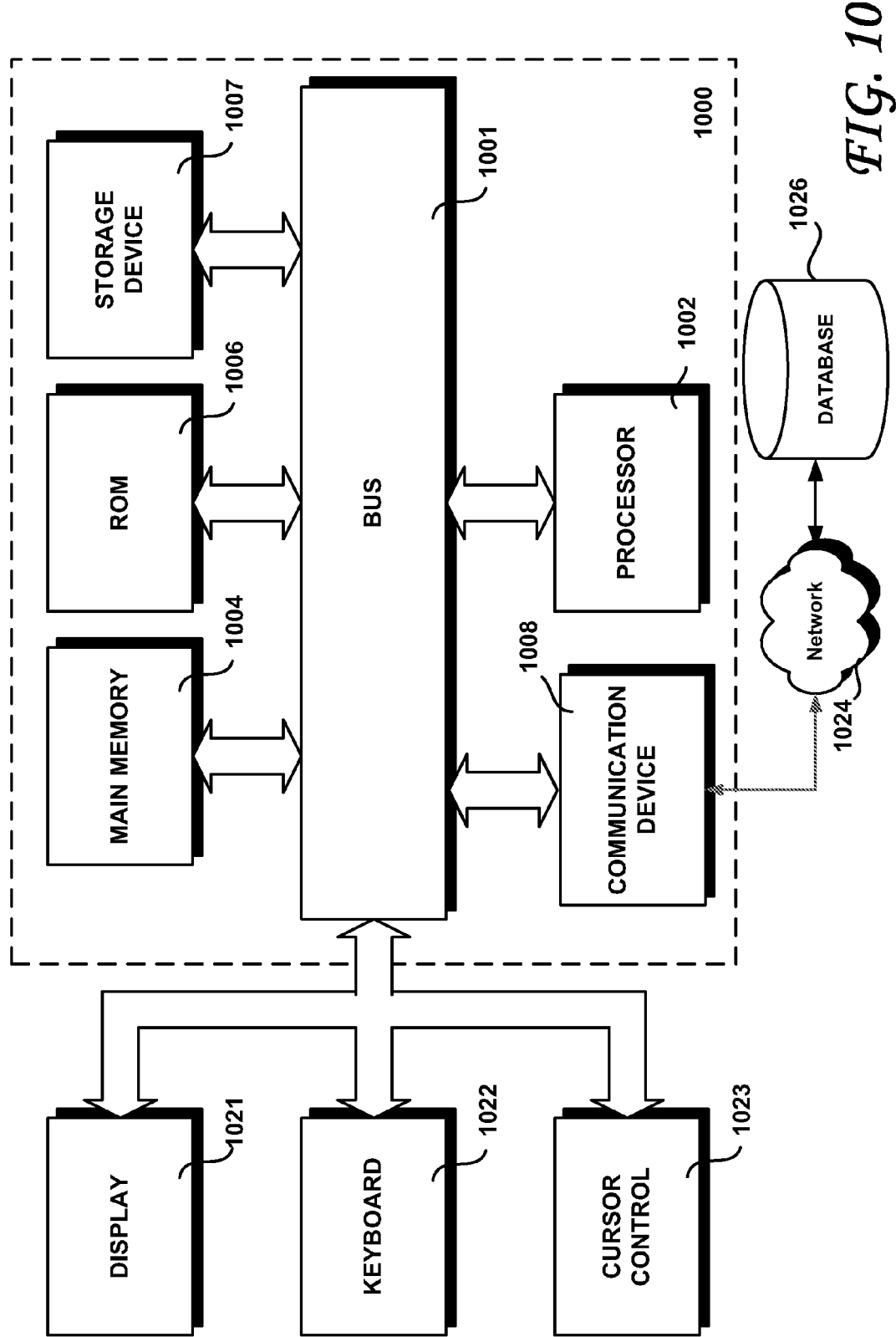
FIG. 10 is a block diagram of a computer suitable for implementing embodiments of the present invention.

FIG. 10 illustrates a block diagram of a computer system 1000 upon which embodiments of the present inventions may be implemented. Computer system 1000 may include a bus 1001 or other communication mechanism for communicating information, and one or more processors 1002 coupled with bus 1001 for processing information. Computer system 1000 further comprises a random access memory (RAM) or other dynamic storage device 1004 (referred to as main memory), coupled to bus 1001 for storing information and instructions to be executed by processor(s) 1002. Main memory 1004 also may be used for storing temporary variables or other intermediate information during execution of instructions by processor 1002. Computer system 1000 also may include a read only memory (ROM) and/or other static storage device 1006 coupled to bus 1001 for storing static information and instructions for processor 1002. A data storage device 1007, such as a magnetic disk or optical disk, may be coupled to bus 1001 for storing information and instructions. The computer system 1000 may also be coupled via the bus 1001 to a display device 1021 for displaying information to a computer user. An alphanumeric input device 1022, including alphanumeric and other keys, may be coupled to bus 1001 for communicating information and command selections to processor(s) 1002. Another type of user input device is cursor control 1023, such as a mouse, a trackball, or cursor direction keys for communicating direction information and command selections to processor 1002 and for controlling cursor movement on display 1021. The computer system 1000 may be coupled, via a communication device (e.g., modem, network interface card) coupled to a network 1024, to a database 1026 configured to store, e.g., the generated test templates, test scenarios, test cases, test steps and test results according to embodiments of the present invention.

Embodiments of the present invention are related to the use of computer system and/or to a plurality of such computer systems to generate and manage test documentation for a software product that includes a plurality of functional areas. According to one embodiment, the methods and systems described herein may be provided by one or more computer systems 1000 in response to processor(s) 1002 executing sequences of instructions contained in memory 1004. Such instructions may be read into memory 1004 from another computer-readable medium, such as data storage device 1007. Execution of the sequences of instructions contained in memory 1004 causes processor(s) 1002 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method for generating and managing test documentation for a software product that includes a plurality of functional areas, the computer-implemented method comprising:
    generating, with one or more processors associated with one or more computer systems, a graphical user interface that enables users to create a test template;
    receiving, at the one or more computer systems, at least one test scenario for one of the plurality of functional areas via the graphical user interface, the at least one test scenario being configured to test a business flow that mimics how an end user of the software product would use the software product;
    storing the at least one test scenario in a database associated with the one or more computer systems in association with the test template according to a data model for the test template;
    receiving, at the one or more computer systems, at least one test case via the graphical user interface, the at least one test case including a plurality of test steps;
    storing the at least one test case in a database associated with the one or more computer systems in association with the test template according to the data model for the test template;
    copying the test template and storing a copy of the test template in a database associated with the one or more computer systems to generate test results, the test results being an entity independent of the test template and stored according to the data model associated with the test template preserving all test scenarios, test cases, their respective formats, hierarchical structure, and data organization constituent of the test template;
    setting, with one or more processors associated with the one or more computer systems, a filter associated with the test results to restrict execution of the at least one test scenario and of the at least one test case to selected scenarios and test cases;
    storing one of a plurality of priority levels in a database associated with the one or more computer system in association with each of the selected test scenarios and each of the selected test cases, and wherein the filter is configured to restrict execution of the at least one test scenario and of the at least one test case to those test scenarios and to those test cases associated with a selected priority level and to those test scenarios and to those test cases associated with a priority level that is lower that the selected priority level; and
    carrying out a test cycle by executing the at least one test scenario and the at least one test case preserved in the test results of the test template and storing the results of the executed at least one test scenario and the executed at least one test case in a database.

2. The computer-implemented method of claim 1, wherein the receiving steps are carried out using, in part, a browser.

3. The computer-implemented method of claim 1, further comprising storing the at least one generated test scenario in a database associated with the one or more computer systems in association with the one of the plurality of functional areas.

4. The computer-implemented method of claim 1, further comprising generating statistics on the stored results of the executed at least one test scenario and the executed at least one test case.

5. The computer-implemented method of claim 1, wherein the test results generated according to the data model associated with the test template are unaffected by subsequent changes to the test template.

6. The computer-implemented method of claim 1, wherein the test template are unaffected by subsequent changes to the test results.

7. The computer-implemented method of claim 1, further comprising creating a new test template by copying the test template and modifying a test scenario and/or test case associated with the test template.

8. The computer-implemented method of claim 1, wherein the test results include expected values for at least some of a plurality of test steps associated with the at least one test case.

9. The computer-implemented method of claim 1, further including populating the test results via the graphical user interface with actual values obtained as a result of carrying out the test cycle.

10. The computer-implemented method of claim 1, further comprising assigning a unique automation identifier to the at least one test scenario and the at least one test case.

11. The computer-implemented method of claim 10, further comprising providing an Application Program Interface (API), the provided API being configured to interface between the test results and commercially available automated testing software.

12. The computer-implemented method of claim 11, further comprising providing the commercially available automated testing software with the generated unique automation identifier of the at least one test scenario and the at least one test case.

13. A non-transitory machine-readable medium having data stored thereon representing sequences of instructions which, when executed by a computing device, causes the computing device to generate and manage test documentation for a software product that includes a plurality of functional areas, the machine-readable medium comprising:

code for generating a graphical user interface that enables users to create a test template;

code for receiving at least one test scenario for one of the plurality of functional areas via the graphical user interface, the at least one test scenario being configured to test a business flow that mimics how an end user of the software product would use the software product;

code for storing the at least one test scenario in a database in association with the test template according to a data model for the test template;

code for receiving, at the one or more computer systems, at least one test case via the graphical user interface, the at least one test case including a plurality of test steps;

code for storing the at least one test case in a database in association with the test template according to the data model for the test template;

code for copying the test template and storing a copy of the test template in a database to generate test results, the test results being an entity independent of the test template and stored according to the data model associated with the test template preserving all test scenarios, test cases, their respective formats, hierarchical structure, and data organization constituent of the test template;

code for setting a filter associated with the test results to restrict execution of the at least one test scenario and of the at least one test case to selected scenarios and test cases;

code for storing one of a plurality of priority levels in a database in association with each of the selected test scenarios and each of the selected test cases, and wherein the filter is configured to restrict execution of the at least one test scenario and of the at least one test case to those test scenarios and to those test cases associated with a selected priority level and to those test scenarios and to those test cases associated with a priority level that is lower that the selected priority level; and code for carrying out a test cycle by executing the at least one test scenario and the at least one test case preserved in the test results of the test template and storing the results of the executed at least one test scenario and the executed at least one test case in a database.

14. The machine-readable medium of claim 13 further comprising code for selecting the test template via the graphical user interface from plurality of test templates provided in a list displayed on the graphical user interface.

15. The machine-readable medium of claim 13 further comprising code for displaying via the graphical user interface a first tab for creating the test template and a second tab for creating the test results based on the test template.

16. The machine-readable medium of claim 13 further comprising code for storing the at least one generated test scenario in a database associated with the one or more computer systems in association with the one of the plurality of functional areas.

17. The machine-readable medium of claim 13, further comprising code for generating statistics on the stored results of the executed at least one test scenario and the executed at least one test case.

18. The machine-readable medium of claim 13, wherein the test results include expected values for at least some of a plurality of test steps associated with the at least one test case.

19. The machine-readable medium of claim 13, further comprising code for populating the test results via the graphical user interface with actual values obtained as a result of carrying out the test cycle.

20. A computer system for generating and managing test documentation for a software product that includes a plurality of functional areas, the computer system comprising:

at least one processor;

at least one data storage device coupled to the at least one processor;

a plurality of processes spawned by said at least one processor, the processes including processing logic for:

generating a graphical user interface that enables users to create a test template;

receiving at least one test scenario for one of the plurality of functional areas via the graphical user interface, the at least one test scenario being configured to test a business flow that mimics how an end user of the software product would use the software product;

storing the at least one test scenario in a database in association with the test template according to a data model for the test template;

receiving at least one test case via the graphical user interface, the at least one test case including a plurality of test steps;

storing the at least one test case in a database in association with the test template according to the data model for the test template;

copying the test template and storing a copy of the test template in a database to generate test results, the test results being an entity independent of the test template and stored according to the data model associated with the test template preserving all test scenarios, test cases, their respective formats, hierarchical structure, and data organization constituent of the test template;

setting a filter associated with the test results to restrict execution of the at least one test scenario and of the at least one test case to selected scenarios and test cases;

storing one of a plurality of priority levels in a database in association with each of the selected test scenarios and each of the selected test cases, and wherein the filter is configured to restrict execution of the at least one test scenario and of the at least one test case to those test scenarios and to those test cases associated with a selected priority level and to those test scenarios and to those test cases associated with a priority level that is lower that the selected priority level; and carrying out a test cycle by executing the at least one test scenario and the at least one test case preserved in the test results of the test template and storing the results of the executed at least one test scenario and the executed at least one test case in a database.

* * * * *

UNITED STATES PATENT AND TRADEMARK OFFICE
CERTIFICATE OF CORRECTION

| | | |
|---|---|---|
| PATENT NO. | : 7,913,230 B2 | Page 1 of 1 |
| APPLICATION NO. | : 11/669913 | |
| DATED | : March 22, 2011 | |
| INVENTOR(S) | : Vikutan | |

It is certified that error appears in the above-identified patent and that said Letters Patent is hereby corrected as shown below:

In column 9, line 39-40, delete "wwwjunit.org)" and insert -- www.junit.org) --, therefor.

In column 12, line 24, in Claim 1, delete "lower that" and insert -- lower than --, therefor.

In column 13, line 45, in Claim 13, delete "lower that" and insert -- lower than --, therefor.

In column 14, line 55, in Claim 20, delete "lower that" and insert -- lower than --, therefor.

Signed and Sealed this
Fourth Day of October, 2011

David J. Kappos
*Director of the United States Patent and Trademark Office*